US011946427B2

(12) United States Patent
Dahl

(10) Patent No.: US 11,946,427 B2
(45) Date of Patent: Apr. 2, 2024

(54) METHOD FOR CONTROLLING THE OPERATION OF AN ENGINE SYSTEM

(71) Applicant: VOLVO TRUCK CORPORATION, Gothenburg (SE)

(72) Inventor: Johan Dahl, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/304,456

(22) Filed: Apr. 21, 2023

(65) Prior Publication Data

US 2023/0349337 A1 Nov. 2, 2023

(30) Foreign Application Priority Data

Apr. 28, 2022 (EP) .................................... 22170620

(51) Int. Cl.
*F02D 41/02* (2006.01)
*F01N 11/00* (2006.01)
(Continued)

(52) U.S. Cl.
CPC ........ *F02D 41/0235* (2013.01); *F01N 11/005* (2013.01); *F02B 37/18* (2013.01);
(Continued)

(58) Field of Classification Search
CPC ............. F02D 13/04; F01N 2900/0601; F01N 11/005; F01N 2430/02
See application file for complete search history.

(56) References Cited

U.S. PATENT DOCUMENTS 8,109,092 B2 2/2012 Pursifull et al.
11,466,634 B1 * 10/2022 Wooldridge .......... F01N 3/2013
(Continued)

FOREIGN PATENT DOCUMENTS

JP 2004346853 A 12/2004

OTHER PUBLICATIONS

Extended European Search Report in corresponding European Application No. 22170620.3 dated Oct. 20, 2022 (6 pages).

*Primary Examiner* — Ngoc T Nguyen
(74) *Attorney, Agent, or Firm* — Venable LLP; Jeffri A. Kaminski

(57) ABSTRACT

A method for controlling the operation of an engine system in a vehicle is provided The engine system includes an engine configured to operate in at least a two-stroke combustion mode and a four-stroke combustion mode, and an exhaust aftertreatment system, EATS configured to reduce emissions from the engine exhausts. The method comprising estimating or predicting the temperature of the EATS; estimating or predicting the emissions out of the EATS; n response of that the temperature of the EATS is below a predetermined temperature threshold, and that the emissions out of the EATS is above a predetermined emission threshold, performing a primary NOx emission reducing activity by operating the engine in a two-stroke combustion mode; subsequently to initiating the operation of the engine in a two-stroke combustion mode, and in response of that the emissions out of the EATS is below the predetermined emission threshold, changing engine operation from the two-stroke combustion mode to a four-stroke combustion mode.

15 Claims, 3 Drawing Sheets

(51) Int. Cl.

| | |
|---|---|
| ***F02B 37/18*** | (2006.01) |
| ***F02D 13/04*** | (2006.01) |
| ***F02D 41/00*** | (2006.01) |
| ***F02D 41/30*** | (2006.01) |

(52) U.S. Cl.
CPC ......... *F02D 13/04* (2013.01); *F02D 41/0087* (2013.01); *F01N 2240/16* (2013.01); *F01N 2430/02* (2013.01); *F01N 2430/08* (2013.01); *F01N 2430/10* (2013.01); *F02D 2041/0012* (2013.01); *F02D 41/3058* (2013.01)

(56) References Cited

U.S. PATENT DOCUMENTS

| | | | |
|---|---|---|---|
| 2007/0056533 | A1 | 3/2007 | Reed et al. |
| 2009/0277434 | A1 | 11/2009 | Surnilla |
| 2010/0300383 | A1 | 12/2010 | Pursifull et al. |

* cited by examiner

METHOD FOR CONTROLLING THE OPERATION OF AN ENGINE SYSTEM

TECHNICAL FIELD

The present invention relates to a method for controlling the operation of an engine system in a vehicle. The invention is particularly related to engine systems comprising an engine and an exhaust aftertreatment system, EATS. The invention further relates to a vehicle, a computer program, a compute readable medium and to a control unit.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes one or more of the following components: a diesel oxidation catalyst, DOC, a diesel particulate filter, DPF, and a selective catalytic reduction SCR catalyst. A reductant, such as urea or an ammonia comprising substance, is typically injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leaves the EATS and the vehicle through the tailpipe of the vehicle. Other types of engines causing at least partly similar emissions as the diesel engine may utilize the same, or a similar, EATS. The engine and the EATS may commonly be referred to as an engine system.

Government regulations, together with a constant demand for increased fuel economy of the vehicle, implies a need for a more efficient operation of the EATS. For example, the EATS must heat up fast and have a high conversion efficiency also at very low loads, and at cold-start of the engine when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea requires heat to evaporate and hydrolyse into ammonia. If the temperature is low, e.g. during cold-start of the engine, there is a large risk for creating crystallization and deposits that reduce the effect of the EATS. Cold-start emissions may e.g. be mitigated by thermal preconditioning of the EATS.

Thermal preconditioning requires energy, especially preconditioning of the engine and/or EATS, as such systems constitutes large thermal buffers of the vehicle. Moreover, there are engine operations which are not related to cold-start operation, but which still results in an unsatisfactory low temperature of the EATS (e.g. engine operations at low loads). There is thus a need in the industry for an improved control of the operation of the engine system to reduce at least some emissions from the vehicle.

SUMMARY

It is an object of the present invention to at least partly alleviate the shortcomings discussed above in relation to known engine system, and provide an improved method for controlling the operation of the engine system.

According to a first aspect of the present invention, a method for controlling the operation of an engine system in a vehicle, the engine system comprising an engine configured to operate in at least a two-stroke combustion mode and a four-stroke combustion mode, and an exhaust aftertreatment system, EATS configured to reduce emissions from the engine exhausts, is provided. The method comprises:

- estimating or predicting the temperature of the EATS;
- estimating or predicting the emissions out of the EATS;
- in response of that the temperature of the EATS is below a predetermined temperature threshold, and that the emissions out of the EATS is above a predetermined emission threshold, performing a primary NOx emission reducing activity by operating the engine in a two-stroke combustion mode;
- subsequently to initiating the operation of the engine in a two-stroke combustion mode, and in response of that the emissions out of the EATS is below the predetermined emission threshold, changing engine operation from the two-stroke combustion mode to a four-stroke combustion mode.

Hereby, the EATS is heated by operating the engine in the two-stroke combustion mode, and the NOx emissions out from the EATS are reduced, but only as long as needed with regards to the predetermined emission threshold. That is, by initiating the operation of the engine in a two-stroke combustion mode in response to that the temperature of the EATS is below the predetermined temperature threshold, and changing the operation of the engine from the two-stroke combustion mode into the four-stroke combustion mode in response to the emissions out of the EATS is below the predetermined emission threshold, a good balance between heating the EATS by means of the two-stroke combustion mode, and any negative impact the two-stroke combustion mode may entail is achieved. The step of changing engine operation from the two-stroke combustion mode to the four-stroke combustion mode is typically initiated during the step of operating the engine in the two-stroke combustion mode. Thus, improved emission reduction at very low loads, and at cold-start of the engine when the temperature of the exhaust gases is low, may be achieved. The improved emissions owing to that the EATS is heated by operating the engine in the two-stroke combustion mode are typically achieved over a time period, e.g. over 2 min-10 min.

According to at least one example embodiment, the engine comprises a plurality of engine cylinders, such as e.g. four, or six, engine cylinders. According to at least one example embodiment, operating the engine in a two-stroke combustion mode includes operating one or more of the engine cylinders of the engine in the two-stroke combustion mode. According to at least one example embodiment, operating the engine in a two-stroke combustion mode includes operating all of the engine cylinders of the engine in the two-stroke combustion mode. According to at least one example embodiment, operating the engine in a two-stroke combustion mode includes operating half of the engine cylinders of the engine in the two-stroke combustion mode.

It should be understood that in the four-stroke combustion mode of the engine, a complete combustion cycle is completed in four strokes of the piston and two revolutions of the crankshaft, and in the two-stroke combustion mode, a complete combustion cycle is completed in two strokes of the piston and one revolution of the crankshaft. Thus, the heating power, or at least the mass flow, of the engine exhaust is typically higher in the two-stroke combustion mode why this mode can be used to heat the EATS faster compared to if the engine is operation in the four-stroke combustion mode. However, operating the engine in the two-stroke combustion mode typically results in degraded combustion efficiency and increased CO2 emissions (i.e. negative impacts). In more detail, the increased heating power of the engine exhaust owing to the two-stroke combustion mode as compared to the four-stroke combustion mode may be realized by operating the engine according to the following criterium. During the two-stroke combustion mode, the intake and exhaust valves of the engine cylinder(s) may be opened twice as often as in the four-stroke combustion mode. Further, fuel may be delivered to the engine at twice the frequency during the two-stroke combustion mode as the during the four-stroke combustion mode. For example, the cylinder may be fueled approximately every 360 crank angle degrees in the two-stroke combustion mode, and approximately every 720 degrees in the four-stroke combustion mode. Further still, ignition of the air and fuel charge within the engine cylinder(s) may be performed around each top dead center, TDC (e.g. approximately every 360 crank angle degrees) in the two-stroke combustion mode, and may be performed around every other TDC in the four-stroke combustion mode (e.g. approximately every 720 crank angle degrees).

According to at least one example embodiment, at least one of, or each one of, the step of estimating or predicting the temperature of the EATS and the step of estimating or predicting the emissions out of the EATS, is performed continuously. However, according to at least one example embodiment, at least one of, or each one of, the step of estimating or predicting the temperature of the EATS and the step of estimating or predicting the emissions out of the EATS, is performed discretely. For example, prior to the operating the engine in the two-stroke combustion mode, the step of estimating or predicting the temperature of the EATS, and the step of estimating or predicting the emissions out of the EATS, are performed. Furthermore, subsequently to initiating the operation of the engine in the two-stroke combustion mode, the step of estimating or predicting the emissions out of the EATS, may be performed again. Additionally, or alternatively, the step of estimating or predicting the temperature of the EATS, may be performed again subsequently to initiating the operation of the engine in the two-stroke combustion mode.

For example, a first estimation or prediction of the temperature of the EATS and the emissions out of the EATS is performed prior to the step of operating the engine in the two-stroke combustion mode. The first estimation or prediction of the temperature of the EATS and the emissions out of the EATS need not to (but may) be performed simultaneously. In response of such first estimation or prediction, and with the result that the temperature (estimated or predicted) of the EATS is below the predetermined temperature threshold, and that the emissions (estimated or predicted) out of the EATS is above the predetermined emission threshold, a primary NOx emission reducing activity is performed by operating the engine in a two-stroke combustion mode. Subsequently, a second estimation of prediction of at least the emissions out of the EATS is performed. In response of such second estimation or prediction, and with the result that the emissions out of the EATS is below the predetermined emission threshold, the engine operation is changed from the two-stroke combustion mode to the four-stroke combustion mode. However, as described above, instead of the first and second estimation or prediction events, the temperature of the EATS and the emissions out of the EATS may be estimated or predicted continuously.

Estimating the temperature of the EATS may be achieved by measuring the temperature of the EATS, or estimating the temperature in response to some temperature characterizing parameter. For example, the temperature of the EATS may be estimated by a known temperature model using e.g. engine out exhaust temperature, mass flow of the engine exhausts and mass flow of hydrocarbons in the engine exhausts. The act of estimating the temperature of the EATS may be referred to as determining the temperature of the EATS. Correspondingly, estimating the emissions out of the EATS may be achieved by measuring the emissions out of the EATS, or estimating the emissions in response to some emission characterizing parameter. For example, the emissions out of the EATS may be estimated by a known emission model using e.g. engine out exhaust temperature, mass flow of the engine exhausts, mass flow of NOx, reductant (e.g. urea) and hydrocarbons in the engine exhausts. The act of estimating the emission out of the EATS may be referred to as determining the emissions out of the EATS.

Predicting the temperature of the EATS may be achieved by modelling the temperature of the EATS in response to a known thermal model of the EATS and predicted vehicle operation. Correspondingly, predicting the emissions out of the EATS may be achieved by modelling the emissions out of the EATS in response to a known emission model and predicted vehicle operation.

For example, estimating the temperature of the EATS, or estimating the emissions out of the EATS, may refer to an estimation of the corresponding parameter (temperature or emissions) at the present time (i.e. at current conditions), while predicting the temperature of the EATS, or predicting the emissions out of the EATS, may refer to a prediction of the corresponding parameter (temperature or emissions) at some point in the future, e.g. at some point during the coming 10 minutes. The emissions out of the EATS may refer to as accumulated emissions over a time span, e.g. over 10 s to 1 min, or over 1 min to 10 min. Thus, the emissions out of the EATS may be current emissions, current emission over the time span, predicted emissions or predicted emissions over the time span.

According to at least one example embodiment, the method comprises:

operating the engine in a four-stroke combustion mode prior to operating the engine in the two-stroke combustion mode.

Thus, the engine may be operated in a four-stroke combustion mode, e.g. as the initial operation of the engine subsequently to engine start (e.g. during the first seconds or minutes), while the (first) estimation or prediction of the temperature of the EATS and the emissions out of the EATS are performed.

According to at least one example embodiment, the method further comprises:

deactivating at least one engine cylinder of the engine during the operation of the engine in a two-stroke combustion mode.

Hereby, not all engine cylinders need to be operating in the two-stroke combustion mode. For example, half of the engine cylinders are deactivated, while the other half are operated in the two-stroke combustion mode. The deactivated engine cylinder(s) needs not to be passive, but the term "deactivated" should be understood as not participating in the combustion of fuel.

According to at least one example embodiment, the deactivated engine cylinder is controlled to perform engine compression brake, either as two-stroke or four-stroke engine compression brake.

Thus, the two-stroke combustion mode may be used together with the deactivation of at least one engine cylinder and engine compression brake.

For example, when the EATS needs to be heated, some engine cylinders may be deactivated and the deactivated cylinders may act as compression brake (either in two-stroke or four-stroke) by that the compressed air is dumped by opening the exhaust valves at top dead center (TDC) for the deactivated engine cylinders. For example, half of the engine cylinders may be deactivated, while the other half are operated in the two-stroke combustion mode. This results in significant losses, which requires the combustion in the engine cylinders operated in the two-stroke combustion mode to generate more torque. The combustion in the engine cylinders results in higher engine exhaust temperature and higher mass flow (as more fuel is injected to the engine) provided that efficiency of any turbo present in the engine is monitored and controlled accordingly. The temperature and mass flow of exhausts out of the engine cylinders operated by compression brake are lower than the temperature and mass flow of the exhausts out of the engine cylinders operated in the two-stroke combustion mode, but the total exhaust temperature and mass flow by the combined exhausts from all engine cylinders still provides increased warming of the EATS compared to if all engine cylinders would to be operated in the two-stroke combustion mode.

Any deactivated engine cylinder(s) may instead of performing compression brake (two-stroke or four stroke) be arranged with the inlet and exhaust valves closed, which results in no flow through the deactivated cylinder(s), which results in lower exhaust flow but higher exhaust temperature as more torque is generated in each of the cylinders operated in a combustion mode (i.e. active cylinders).

According to at least one example embodiment, the method further comprises:

prior to changing engine operation from the two-stroke combustion mode to the four-stroke combustion mode, and in response of that the temperature of the EATS is below the predetermined temperature threshold, and that the emissions out of the EATS is above the predetermined emission threshold, performing a compensatory NOx emission reducing activity different to operating the engine in a two-stroke combustion mode.

Hereby, the primary NOx emission reducing activity being the operation of the engine in the two-stroke combustion mode, can be complemented with one or more compensatory NOx emission reducing activities. Thus, the heating of the EATS and the thereby improved NOx emission reduction, may be achieved by the operation of the engine in the two-stroke combustion mode together with a compensatory NOx emission reducing activity. For example, the compensatory NOx emission reducing activity may reduce the operating time of the primary NOx emission reducing activity (i.e. reduced the time in which the engine is operated in the two-stroke combustion mode) as the predetermined emission threshold is met earlier compared to a scenario not performing a compensatory NOx emission reducing activity. Alternatively, the EATS may operate in an acceptable manner even though the temperature of the EATS is below the predetermined temperature threshold, as the compensatory NOx emission reducing activity reduced the NOx emissions.

According to at least one example embodiment, the compensatory NOx emission reducing activity includes at least one of the following: using wastegate, late fuel injection, electrical heating of at least a part of the EATS, changing engine valves opening/closing, reduce the flow of exhaust through the engine and EATS (e.g. by controlling an intake throttle).

Such compensatory NOx emission reducing activities are well known and readily available by the engine control system. For example, wastegate is a valve that controls the flow of exhaust gases to the turbine wheel in a turbocharged engine system. Thus, using wastegate is possible for embodiments in which the engine system comprises a wastegate valve and a turbocharger. Late fuel injection and changing engine valves (typically intakes and exhausts valves) opening and closing are typically controlled by the engine control system. For embodiments in which the EATS is equipped with an electrical heater, using such electrical heater for heating the EATS results in reduced NOx emissions as a result of the increased temperature of the EATS. The activity of reducing the flow of exhaust through the engine and EATS may be achieved using a throttle valve (such as the inlet throttle valve of the engine system, or an exhaust throttle).

For embodiments in which the engine system comprises an exhaust gas recirculation, EGR, arrangement, different activities of the EGR arrangement may be included as alternatives of the compensatory NOx emission reducing activities, for example using warm EGR valve, using cold EGR valve, or operating the EGR pump, such that the temperature of EATS is increased. As another alternative, activation of charging of a vehicle battery may be included as alternatives of the compensatory NOx emission reducing activities as such charging adds torque load to the engine, resulting in a higher mass flow and a higher temperature of the exhausts.

According to at least one example embodiment, the EATS comprises a fluid channel for providing a fluid pathway for the engine exhausts, an EATS outlet, and at least one emission reducing component arranged in the fluid channel and selected from the following: a selective catalyst reduction, SCR, catalyst, an oxidation catalyst, and a particulate filter, wherein the temperature of the EATS corresponds to the temperature of the at least one emission reducing component or the temperature of the EATS outlet.

Hereby, readily available alternatives for measuring the temperature of the EATS is provided. In other words, the estimated or predicted temperature of the EATS corresponds to the temperature of the at least one emission reducing component or the temperature of the EATS outlet. Typically, the measured temperature of the EATS reflects the operability of the EATS e.g. with regards to the capability of reducing NOx emissions. Thus, preferably, the temperature of the EATS is the temperature of the SCR catalyst.

According to at least one example embodiment, the EATS comprises a reductant injection arrangement for injecting a reductant to the SCR catalyst, wherein the temperature of the EATS corresponds to the temperature of the reductant in the reductant injection arrangement. Typically, the reductant is UREA.

According to at least one example embodiment, the estimated or predicted emissions out of the EATS comprises the amount of NOx.

That is, the estimated or predicted emissions out of the EATS may comprise estimated or predicted NOx emissions. In other words, the method may comprise the steps of estimating or predicting the NOx emissions out of the EATS, and in response of that the temperature of the EATS is below the predetermined temperature threshold, and that the NOx emissions out of the EATS is above the predetermined emission threshold, performing a primary NOx emission reducing activity by operating the engine in a two-stroke combustion mode; and subsequently to initiating the operation of the engine in a two-stroke combustion mode, and in response of that the NOx emissions out of the EATS is below the predetermined emission threshold, changing engine operation from the two-stroke combustion mode to a four-stroke combustion mode. Thus, and according to at least one example embodiment, changing engine operation from the two-stroke combustion mode to the four-stroke combustion mode is performed in response to that the predicted NOx emissions out of the EATS is below the predetermined emission threshold.

According to at least one example embodiment, the estimated or predicted emissions out of the EATS further comprises the amount of $NO_2$ and/or the amount of $N_2O$ and/or the amount of $NH_3$. Moreover, also the amount of $CO_2$ emissions may be predicted or estimated, and may be included in the estimated or predicted emissions out of the EATS.

According to at least one example embodiment, the predetermined temperature threshold is related to the operating temperature (or normal operating temperature) of the EATS, and the predetermined emission threshold is related to emission legalisation.

According to at least one example embodiment, the predetermined temperature threshold corresponds to a temperature of between 140° C. and 250° C.

Thus, below such temperature, the EATS is typically in need of heating in order to operate satisfactory. Operation of the EATS below its operating temperature (or normal operating temperature) results in an inferior capability of the EATS to reduce the emissions of the engine exhaust, in particular the NOx emissions. In embodiments in which the reductant injection arrangement is pre-heated, the temperature of the EATS may be in the higher interval given above, e.g. between 200° C. and 250° C., as the injected reductant is pre-heated and thus more easily hydrolyzed into $NH_3$.

According to at least one example embodiment, the method further comprises:

- determining predicted vehicle operational information comprising at least a predicted upcoming road event and a predicted engine operation associated with the upcoming road event, wherein the emissions out of the EATS are calculated emissions associated with the predicted engine operation.

That is, the emissions out of the EATS may be predicted based on the predicted engine operation. Hereby, predicted vehicle operational information can be used to improve the operation of the engine system so that the EATS is operated in an improved manner.

According to at least one example embodiment, the emissions out of the EATS is predicted cold-start emissions associated with the predicted engine operation.

Thus, the predicted vehicle operational information may include cold-start operation and thus, the predicted emissions out of the EATS may be cold-start emissions (determined in response to the predicted engine operation). Thus, the step of performing a primary NOx emission reducing activity by operating the engine in a two-stroke combustion mode can be performed in response to the vehicle operational information on the basis that the cold-start emissions of the predicted engine operation is above the predetermined emission threshold. Hereby, cold-start emissions can be reduced by the primary (and compensatory) NOx emission reducing activities. The cold-start emissions of the predicted engine operation may be estimated from the engine operational initialization time to a time at which the engine system has reached its operating temperature or normal operating temperature.

According to at least one example embodiment, the predicted vehicle operational information is based on historical or statistical data of the vehicle operation, or is scheduled vehicle operational information based on a predetermined planned vehicle operation.

Hereby, various types of the vehicle information can be used as input data to determine the predicted vehicle operational information. That is, historical or statistical data of the vehicle operation is used as input data to determine the predicted vehicle operational information, or pre-determined planned vehicle operation is used as input to determine scheduled vehicle operational information. Stated differently, the predicted vehicle operational information is determined in response to historical or statistical data of the vehicle operation, or is scheduled vehicle operational information determined in response to pre-determined planned vehicle operation. For example, the historical time-span which the vehicle is operated, and/or the historical weekdays which the vehicle is operated e.g. related to the historical vehicle route, may be statistically used as input data to the predicted vehicle operational information. Additionally or alternatively, external parameters such as predicted road, traffic and/or weather conditions for the predicted vehicle operational information may be used to determine e.g. engine operational initialization time and/or predicted engine operation. For the scheduled vehicle operational information, scheduled initialization time of the vehicle may correspond to engine operational initialization time, and scheduled operational load of the engine may correspond to the predicted engine operation. For example, a vehicle or transportation planner system may be used as input data to the pre-determined planned vehicle operation and the scheduled vehicle operational information. Additionally or alternatively, external parameters such as predicted road, traffic and/or weather conditions for the scheduled vehicle operational information may be used to determine e.g. scheduled initialization time and/or scheduled operational load of the engine. According to at least one example embodiment, the scheduled vehicle operational information comprises a scheduled route of the vehicle, and possibly scheduled auxiliary actions of performing work during at least a portion of the scheduled route.

According to at least one example embodiment, the predicted vehicle operational information represents future, expected, or scheduled operation of the vehicle (i.e. at least the future, expected or scheduled vehicle initialization time and the future, expected or scheduled engine operation). The predicted vehicle operational information may according to at least one example embodiment correspond to the predicted initial operation of vehicle, e.g. up to the (normal) operating temperature of the engine system has been reached. For example, in the case of cold-start operation of the engine system, the predicted vehicle operational information may correspond to the predicted operation of vehicle up to a point in time at which no longer any cold-start emissions are emitted from the vehicle (i.e. without performing any primary or compensatory NOx emission reducing activities, e.g. by operating the engine in the four-stroke combustion mode). However, according to at least one example embodiment, the predicted vehicle operational is continuously monitored.

The predicted vehicle operational information may according to at least one example embodiment be predicted information in the near future (e.g. the near future of the engine operational initialization time), over a time span of e.g. 0 s or 1 s to 30 min, or 0 s or 1 s to 20 min, or 0 s or 1 s to 15 min or 0 s or 1 s to 10 min or 1 s to 5 min or 0 s or 1 s to 2 min or 0 s or 1 s to 1 min. The predicted engine operation may according to at least one example embodiment be determined for the initial operation of the vehicle, e.g. by that the engine operational load is determined during such initial operation of the vehicle over said time span. According to at least one example embodiment, the cold-start emissions of the predicted engine operation is predicted over such initial operation of the vehicle.

According to at least one example embodiment, the predicted engine operation comprises predicted engine speed and/or predicted engine torque in response to the predicted road event. According to at least one example embodiment, the emissions out of the EATS, e.g. the cold-start emissions of the predicted engine operation, is based on the emissions associated with the predicted engine speed and/or predicted engine torque.

Hereby, the prediction of the emissions out of the EATS of the predicted engine operation can be made more accurate. The predicted engine operation may be determined in response to at least the historical or statistical data of the vehicle operation, or the pre-determined planned vehicle operation, as previously described. Moreover, any external parameters such as predicted road, traffic and/or weather conditions as previously described may be included in the predicted engine operation. The predicted engine speed and/or predicted engine torque are important parameters of the engine operation, influencing e.g. fuel consumption, vehicle speed, emissions out from the engine and/or emissions (such as cold-start emissions) out from the EATS. Thus, by the predicted engine speed and/or predicted engine torque, the operation of the EATS may be improved by acting in response to such information.

According to at least one example embodiment, the predicted road event comprises map data. Such map data may e.g. comprise information of predicted or upcoming topology of the road (e.g. a downhill or uphill) and/or predicted or upcoming road curves and/or predicted or upcoming road conditions. The map data may be correlated with positional data of the, e.g. by means of a GPS or other vehicle localization means. The predicted road event may additionally or alternatively include predicted or upcoming parking lots or predicted or upcoming traffic lights or expected traffic jams, i.e. at least partly determined by the previously described external parameters. For any such predicted road event, the operation of the vehicle is typically associated with a corresponding engine operation, i.e. a future, expected or scheduled engine operation in response to the predicted road event. For example, if the predicted road event comprises a parking lot in which the vehicle is to be parked, the engine operation associated with such upcoming parking lot may e.g. be predicted engine idling, as the vehicle is to be at least temporarily stopped at the parking lot (other engine operations associated with such upcoming parking lot may be predicted reduced engine speed and predicted downshifting prior to the predicted engine idling). Another example of a predicted road event is a predicted or upcoming uphill. The engine operation association with such uphill may e.g. be predicted downshifting and/or predicted increased engine torque, as the vehicle is to drive uphill with e.g. a maintained speed or at a speed resulting in a desired balance between vehicle speed and fuel consumption. A third example of a predicted road event is continuous driving on a high-way, typically preceded by a quick acceleration to reach the vehicle speed of the high-way. Any such predicted vehicle operation can be used to determine predicted engine speed and/or predicted engine torque, and thus the related temperature of the EATS and emissions out of the EATS. The predicted road event may additionally comprise a vehicle destination, i.e. a road position at which the vehicle is to stop and perform engine shut-off.

With reference to the previous description of estimated or predicted temperature of the EATS. According to at least one example embodiment, the temperature of the EATS may be predicted in response to the predicted engine operation. In more detail, the method may comprise: determining a predicted temperature of the EATS associated with the predicted engine operation, wherein performing a primary NOx emission reducing activity by operating the engine in a two-stroke combustion mode is carried out in response to that predicted temperature of the EATS is below the predetermined temperature threshold.

According to at least one example embodiment, changing engine operation from the two-stroke combustion mode to a four-stroke combustion mode is performed regardless of if the temperature of the EATS is below or above the predetermined temperature threshold.

For example, changing engine operation from the two-stroke combustion mode to a four-stroke combustion mode may be performed while the temperature of the EATS is below the predetermined temperature threshold.

According to at least one example embodiment, changing engine operation from the two-stroke combustion mode to the four-stroke combustion mode is performed in response to that the temperature of the EATS is higher than the temperature of the exhaust gases from the engine (i.e. engine out temperature). Thus, the method may comprise estimating (e.g. measuring) and/or predicting the engine out exhaust gases.

According to a second aspect of the present invention, an engine system of a vehicle, the engine system comprising and engine configured to operate in at least a two-stroke combustion mode and a four-stroke combustion mode, and an exhaust aftertreatment system, EATS, configured to reduce emissions from the engine exhausts, is provided. The EATS comprises a control unit configured to:

estimate or predict the temperature of the EATS;

estimate or predict the emissions out of the EATS;

in response of that the temperature of the EATS is below a predetermined temperature threshold, and that the emissions out of the EATS is above a predetermined emission threshold, instruct the engine system to perform a primary NOx emission reducing activity by operating the engine in a two-stroke combustion mode;

subsequently to initiating the operation of the engine in a two-stroke combustion mode, and in response of that the emissions out of the EATS are below the predetermined emission threshold, instructing the engine to change its engine operation from the two-stroke combustion mode to a four-stroke combustion mode.

Thus, and according to at least one example embodiment of the invention, the control unit of the engine system is configured to perform the method described with reference to the first aspect of the invention.

Effects and features of the second aspect of the invention are largely analogous to those described above in connection with the first aspect of the invention. Embodiments mentioned in relation to the first aspect of the invention are largely compatible with the second aspect of the invention, of which some are exemplified below. The control unit is typically further configured to operate any valves or actuators of the engine or EATS in response to the temperature of the EATS and the emissions out of the EATS.

According to a third aspect of the present invention, a vehicle comprising an engine system in accordance with the second aspect of the invention is provided.

According to a fourth aspect of the present invention, a computer program comprising program code means comprising instructions to cause the engine system of the second aspect of the invention to execute the steps of the method of the first aspect of the invention, when said program is run on a computer, is provided.

According to a fifth aspect of the present invention, a computer readable medium carrying a computer program comprising program code means comprising instructions to cause the engine system of the second aspect of the invention to execute the steps of the method of the first aspect of the invention, when said computer program is run on a computer, is provided.

According to a sixth aspect of the present invention, a control unit for controlling the operation of an engine system in a vehicle, the control unit being configured to perform the steps of the method of the first aspect of the invention, is provided.

Effects and features of the third to sixth aspects of the invention are largely analogous to those described above in connection with the first and second aspects of the invention. Embodiments mentioned in relation to the first and second aspects of the invention are largely compatible with the third to sixth aspects of the invention.

For all of the first to sixth aspects of the invention, the SCR catalyst may be comprised in the main muffler of the vehicle. Additionally or alternatively, the EATS may comprise an oxidation catalyst, e.g. a diesel oxidation catalyst (abbreviated DOC) and/or a particulate filter, e.g. a diesel particulate filter (abbreviated DPF). The oxidation catalyst and/or the particular filter is advantageously arranged upstream of the SCR catalyst. Additionally or alternatively, the EATS may comprise a pre-SCR catalyst, and a pre-injector arranged upstream the pre-SCR catalyst for providing reductant to the pre-SCR catalyst. The engine system may comprise an engine chosen from various types of engines, such as e.g. engines using diesel, petrol, hydrogen or gaseous fuels as fuel. For example, the present EATS may be used to clean exhaust gases by converting NOx emissions from the exhausts of internal combustion engines using diesel, petrol, CNG (Compressed Natural Gas), LPG (Liquified Pressurized Gas), DME (DiMethylEther), and/or H2 (Hydrogen) as fuel.

The order of the method steps described in the first aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
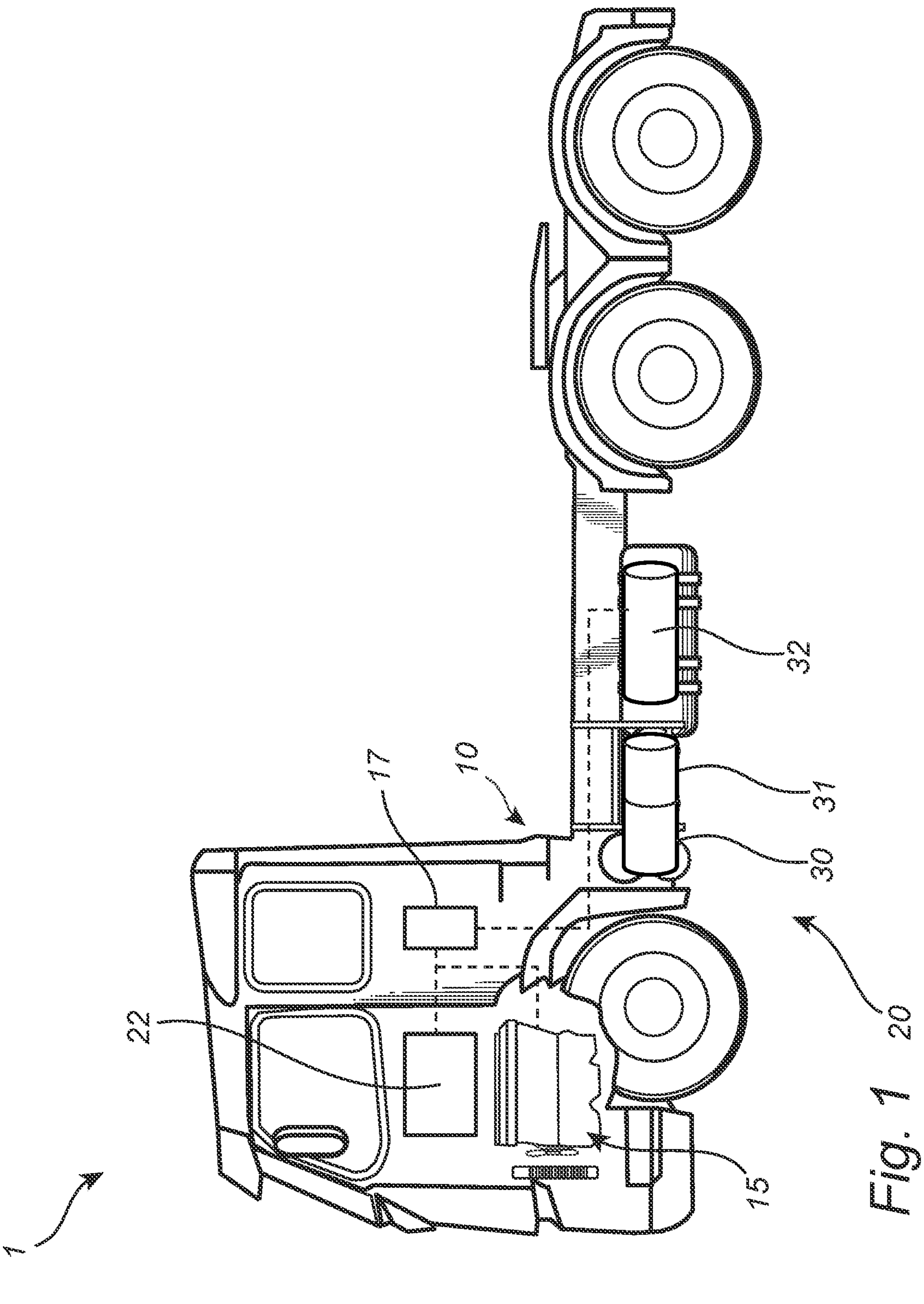
FIG. 1 is a schematic side view of a vehicle comprising an engine system, and an exhaust aftertreatment system of the engine system, in accordance with an example embodiment of the invention.

With reference to FIG. 1 a vehicle 1, here embodied as a heavy duty truck 1, comprising an engine system 10, is disclosed for which a control unit 17 of a kind disclosed in the present disclosure is advantageous. However, the control unit 17 may as well be implemented in other types of vehicles, such as in busses, light-weight trucks, passenger cars, marine applications etc having similar engine systems. The vehicle 1 of FIG. 1 is a hybrid vehicle 1 comprising an engine 15, which in this embodiment is a diesel engine 15, and an electric machine 22. The diesel engine 15 is powered by diesel fuel, typically comprised in a fuel tank (not shown) and the electric machine 22 is powered by electricity supplied from at least one energy storage or transformation device, e.g. a battery or a fuel cell. The diesel engine 15 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the diesel engine 15 alone, the electric machine 22 alone, or by the diesel engine 15 together with the electric machine 22.

In FIG. 1, at least the diesel engine 15 is comprised in the engine system 10, the engine system 10 further comprising an exhaust aftertreatment system, EATS, 20 having at least an SCR catalyst 32, an oxidation catalyst in the form of a DOC 30, and a particle filter in the form of a DPF 31. The DPF 31 is arranged upstream of the SCR catalyst 32, and is arranged and configured to remove particles, e.g. diesel particulate matter or soot, from the exhaust gas of the diesel engine 15. The SCR catalyst 32 is arranged and configured to convert nitrogen oxides, also referred to as NOx, with the aid of a catalyst, into diatomic nitrogen (N2), and water (H2O) (and potentially carbon dioxide CO2). A reductant, typically anhydrous ammonia, aqueous ammonia or urea solution (commonly referred to as urea in the present disclosure), is added to engine exhausts and is absorbed onto the catalyst in the SCR catalyst 32. The DOC 30 is arranged upstream of the DPF 31 and is configured to convert carbon monoxide and hydrocarbons into carbon dioxide. The SCR catalyst 32, the DOC 30 and the DPF 31 are examples of emission reducing components of the EATS 20, of which all need not to be included for the present invention. The engine system 10 is described in more detail with reference to FIG. 2.

Figure 2:
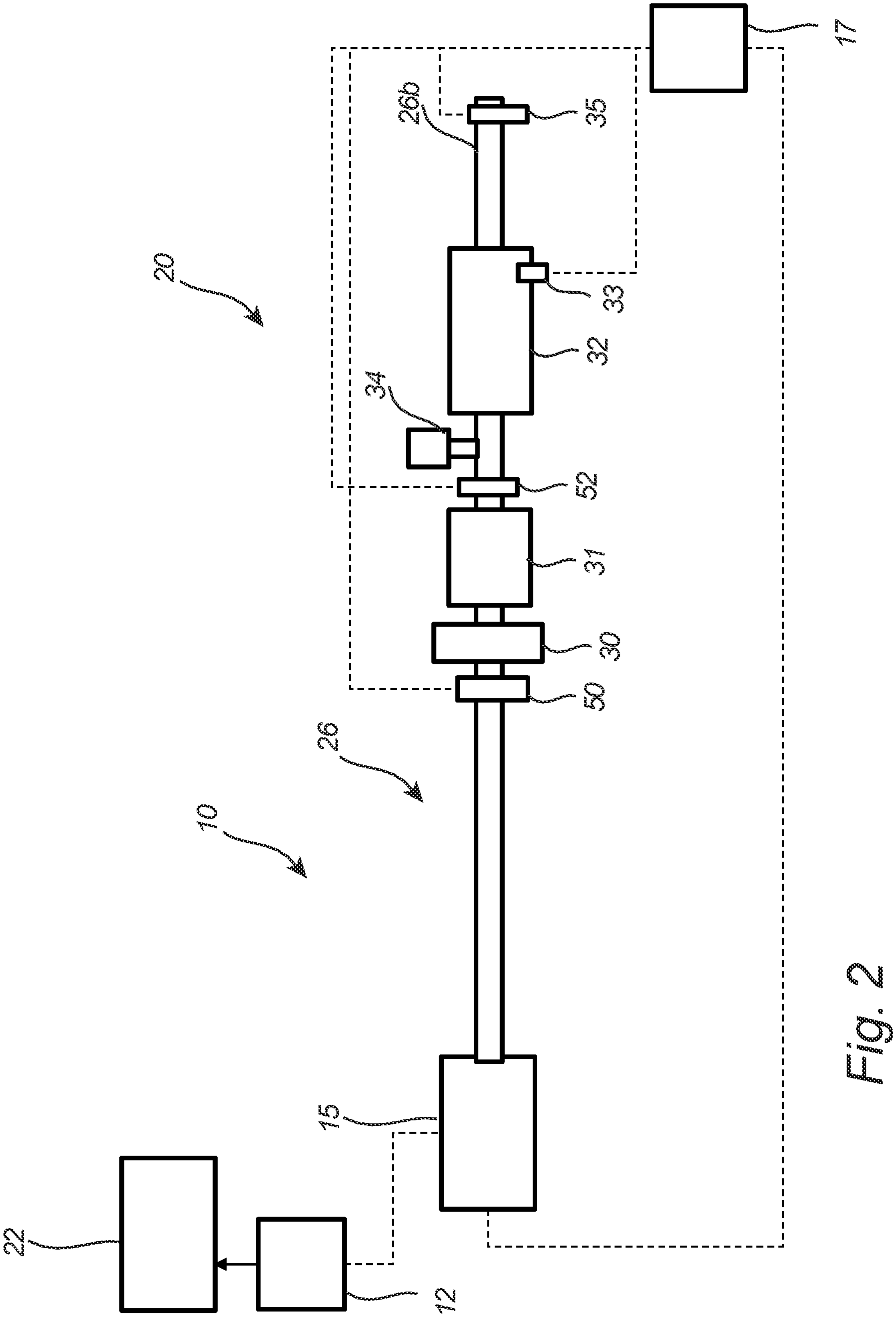
FIG. 2 is a schematic view of an engine system, and an exhaust aftertreatment system of the engine system, of a vehicle in accordance with example embodiments of the invention.

FIG. 2 discloses the engine system 10 of vehicle 1 of FIG. 1 in more detail. The engine system 10 comprises, as already described with reference to FIG. 1, a diesel engine 15 and an EATS 20 having a fluid channel 26 for providing a fluid pathway for the engine exhausts to an EATS outlet 26*b*, the three emission reducing components already mentioned with reference to FIG. 1, i.e. the SCR catalyst 32, the DOC 30 and the DPF 31. As show in FIG. 2, a temperature sensor 33 is coupled to the SCR catalyst 32 for measuring the temperature of the EATS 20, an in particular the temperature of the SCR catalyst 32. However, it should be noted that the temperature sensor may be arranged elsewhere in the EATS 20, and not necessarily at the SCR catalyst 32. Furthermore, a NOx sensor 35 is arranged at the EATS outlet 26*b* for measuring the NOx in the emissions out of the EATS 20 (also referred to as tailpipe NOx).

The control unit 17 is configured to control at least part of the operation of the engine system 10 and/or the EATS 20. It should however be mentioned that the control unit 17 may be provided outside of the EATS 20 and/or the engine system 10 and instead be comprised in another part of the vehicle 1. Moreover, as a further example an ammonia slip catalyst, ASC, may be arranged downstream of the SCR catalyst 32 for handling any ammonia slip from the SCR catalyst 32. Moreover, the EATS 20 may comprise a pre-SCR catalyst arranged upstream of the DOC 30.

A reductant injector 34 is in the embodiment in FIG. 2 arranged upstream the SCR catalyst 32 for providing reductant to the SCR catalyst 32. The reductant injector 34 is typically fluidly connected to a reductant dosing system comprising a storage tank for the reductant and a pressuring means, typically a pump, for pressurising the reductant prior to injection.

The EATS 20 may comprises means for providing determination/measurement of the emissions out of the diesel engine 15 (e.g. engine out NOx), ammonia storage of the SCR catalyst 32, the temperature of the SCR catalyst 32 (e.g. temperature sensor 33 previously mentioned), the temperature at the EATS outlet 26*b*, the emissions at the EATS outlet 26*b* (e.g. the NOx emissions, or tailpipe NOx emissions). For such purposes, the EATS 20 may comprise suitable a temperature sensors and/or ammonia sensors and/or NOx sensors.

As also indicated in FIG. 2, the control unit 17 is communicatively connected to the diesel engine 15. Thus, the diesel engine 15 may be instructed by the control unit 17 to perform various engine operations, such as e.g. setting the combustion mode as two-stroke or four-stroke, and/or individual setting of the engine cylinders.

As described with reference to FIG. 1, the engine system 10 may comprise an electric machine 22 powered by electricity supplied from at least one energy storage or transformation device, e.g. a battery or a fuel cell. In FIG. 2 the electric machine 22 is shown as being operable by a rechargeable energy storage system, RESS 12, comprising at least one battery. The diesel engine 15 may be coupled to the RESS 12 for charging the battery.

For example, during initial operation of vehicle, e.g. up to a point in time at which the (normal) operating temperature of the engine system has been reached, the emissions (e.g. emissions per travelled distance, or emissions per unit operational time or emission per energy, g/kWh) out of the EATS are typically higher compared to when the operating temperature of the engine system has been reached. Such emissions are referred to as cold-start emissions and they typically comprises undesired compounds (such as NOx, particles, and CO or unburned HC) in the exhaust out from the EATS as a result of the cold-start of the engine system. The initial operation of the vehicle may e.g. span over the near future to the engine operational initialization time, e.g. over a time span of e.g. 0 s or 1 s to 30 min, or 0 s or 1 s to 20 min, or 0 s or 1 s to 15 min, or 0 s or 1 s to 10 min. Thus, the cold-start emissions of the vehicle are the emissions in the exhausts out from the EATS 20 during such initial operation of the vehicle. There are also other vehicle operational conditions for which the operating temperature (or normal operating temperature) of the engine system, or at least the operating temperature of the EATS, is not achieved. Such vehicle operational conditions may also load to elevated, or at least unnecessarily high, emissions.

In order to avoid, or at least reduce, elevated emissions of NOx, at least one NOx emission reducing activity can be applied. That is, at least a part of the engine system 10 may be operated in such a way that the NOx emissions during vehicle operations suffering from low temperatures in the engine system is reduced.

Figure 3:
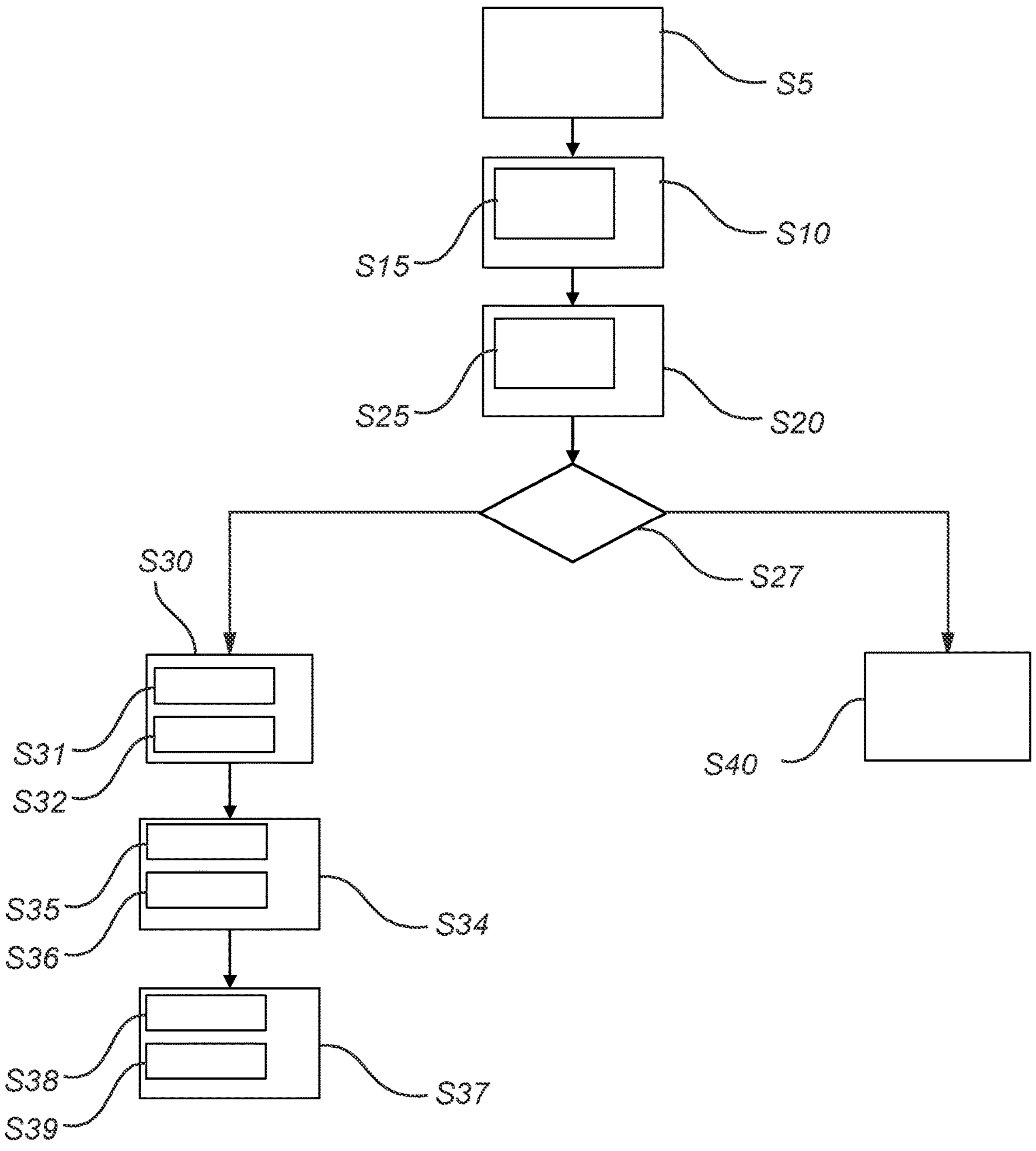
FIG. 3 is a flowchart illustrating the steps of a method in accordance with example embodiments of the invention.

A method for controlling the operation of an engine system in a vehicle by performing at least a primary NOx emission reducing activity will now be described with reference to the flowchart of FIG. 3, schematically illustrating steps of such method. The engine system, such as the engine system 10 of FIGS. 1 and 2, comprises an engine configured to operate in at least a two-stroke combustion mode and a four-stroke combustion mode, such as e.g. the diesel engine 15 of FIGS. 1 and 2, and an exhaust aftertreatment system, EATS, such as EATS 20 of FIGS. 1 and 2.

In an optional step S5, which may be performed prior (or simultaneously with) any one of steps S10 and S20 described below, predicted vehicle operational information comprising at least a predicted upcoming road event and a predicted engine operation associated with the upcoming road event is determined. The predicted vehicle operational information may be based on historical or statistical data of the vehicle operation, or may be scheduled vehicle operational information based on a pre-determined planned vehicle operation. Typically, such pre-determined planned vehicle operation is based on map data. The predicted vehicle operational information may furthermore comprises an engine or vehicle operational initialization time (i.e. at point in time in which the engine is started, or in which the vehicle is started). Moreover, the predicted engine operation associated with the upcoming road event typically comprises predicted engine speed and/or predicted engine torque in response to the upcoming road event. The predicted vehicle operational information may further comprise at least one external parameter such as predicted traffic and/or weather conditions associated with, or comprised in, the upcoming road event.

In a step S10, e.g. being a first step S10, the temperature of the EATS 20 is estimated or predicted. For example, the temperature of the EATS may be estimated based on a temperature measurement. For example, the temperature of at least one the previously mentioned emission reducing components of the EATS can be measured using a temperature sensor. As exemplified in FIG. 2, the temperature of the SCR catalyst 32 may be measured by temperature sensor 33, but it should be mentioned that any one of the other emission reducing components, such as the DOC 30 and the DPF 31 could be coupled to a temperature sensor for measuring the temperature thereof. As a further alternative, the temperature could be estimated using a temperature sensor arranged at the EATS outlet 26*b*. Predicting the temperature of the EATS 20 may alternatively be achieved by modelling the temperature of the EATS 20 in response to a known thermal model of the EATS 20 and predicted vehicle operation using predicted vehicle operational information from the step S5. That is, in a step S15, a predicted temperature of the EATS 20 associated with the predicted engine operation may be determined.

In a step S20, e.g. being a second step S20, the emissions out of the EATS 20 is estimated or predicted. Typically the estimated or predicted emissions out of the EATS 20 comprises the estimated or predicted amount of NOx emissions. For example, the emissions out of the EATS 20 may be estimated based on a measurement based on a NOx sensor, e.g. arranged at the EATS outlet **26*b* as shown in FIG. 2. Correspondingly to the prediction of the temperature, the emissions out of the EATS may be predicted (calculated) by modelling the emissions out of the EATS in response to a known emission model and predicted vehicle operation using predicted vehicle operational information. The emissions out of the EATS 20 may e.g. be the predicted cold-start emissions associated with the predicted engine operation associated with the upcoming road event of the predicted vehicle operational information. That is, in a step S25, a predicted emission out of the EATS 20** associated with the predicted engine operation may be determined.

For example, the cold-start emissions of the predicted engine operation may be based on the cold-start emissions associated with the predicted engine speed and/or predicted engine torque. The cold-start emissions of the predicted engine operation may for example be estimated from the engine operational initialization time to a time at which the engine system has reached (or is predicted to have reached) its (normal) operating temperature.

It should be noted that, at least one of, or each one of, the steps S10 and S20 may be performed continuously. Hereby, the temperature of the EATS 20 and/or the emissions out of the EATS 20 may be continuously estimated (or measured), or continuously predicted. The steps S10 and S20 may be performed simultaneously, or subsequently, in any order. In case the steps S10 and S20 are performed discretely, subsequent steps of estimating or predicting the temperature of the EATS 20 and/or the emissions out of the EATS 20 are typically repeated as will be described in the following.

In a step S27, performed subsequently to at least steps S10 and S20, the estimated or predicted temperature of the EATS 20 is compared to a predetermined temperature threshold, and the estimated or predicted emissions out of the EATS 20 is compared to a predetermined emission threshold.

In response of an outcome of step S27 being that the temperature of the EATS is below the predetermined temperature threshold, the temperature e.g. be estimated by measuring the temperature of the EATS 20 during the step S10, and that the emissions out of the EATS 20 is above the predetermined emission threshold, the emissions e.g. be estimated by measuring the NOx emissions out of the EATS 20 during the step S20, a primary NOx emission reducing activity is performed in step S30 by operating the engine 15 in a two-stroke combustion mode. As mentioned previously, the step S30 may be carried out in response to a prediction of the temperature of the EAST 20 in step S10, and thus performing the step S30 may be carried out in response to that predicted temperature of the EATS 20 is below the predetermined temperature threshold. Additionally, or alternatively, the step S30 may be carried out in response to a prediction of the emissions out of the EATS 20 in step S20, and thus performing the step S30 may be carried out in response to that predicted emissions out of the EATS 20 is above the predetermined emission threshold.

Thus, the engine 15 is operated in the two-stroke combustion mode in order to increase the heating of the EATS 20. The operation of the engine 15 in the two-stroke combustion mode may continue for time period until a new criterium is met which enables the operation of the engine 15 to be operated in a four-stroke combustion mode.

During the operation of the engine 15 in the two-stroke combustion mode, at least one engine cylinder may be deactivated in a step S31. Hereby, not all engine cylinders of the engine 15 need to be operating in the two-stroke combustion mode. For example, half of the engine cylinders may be deactivated, while the other half are operated in the two-stroke combustion mode. The deactivated engine cylinder(s) needs not to be passive, but the term "deactivated" should be understood as not participating in the combustion of fuel.

In a subsequent step S32, the deactivated engine cylinder may be controlled to perform engine compression brake, either as two-stroke or four stroke engine compression brake. Thus, the two-stroke combustion mode may be used together with the deactivation of at least one engine cylinder and engine compression brake.

The engine 15 may be operated in a four-stroke combustion mode prior to initiating the operation of the engine 15 in the two-stroke combustion mode. Thus, the engine 15 may be operated in a four-stroke combustion mode, e.g. as the initial operation of the engine 15 subsequently to engine start (e.g. during the first seconds or minutes), while the (first) estimation or prediction of the temperature of the EATS and the emissions out of the EATS in steps S10 and S20 are performed. Moreover, in response of an outcome of step S27 being that the temperature of the EATS is above the predetermined temperature threshold, the temperature e.g. be estimated by measuring the temperature of the EATS 20 during the step S10, and that the emissions out of the EATS 20 is below the predetermined emission threshold, the emissions e.g. be estimated by measuring the NOx emissions out of the EATS 20 during the step S20, a step S40 of operating the engine 15 in the four-stroke combustion mode may be performed. Thus, the operation of the engine 15 may be continued in the four-stroke combustion mode, or in case the engine 15 was operating in the two-stroke combustion mode, be changed into the engine operation of the four-stroke combustion mode.

During the operation of the engine 15 in the two-stroke combustion mode, and prior to changing engine operation from the two-stroke combustion mode to the four-stroke combustion mode, and in response of that the temperature of the EATS 20 is below the predetermined temperature threshold, and that the emissions out of the EATS 20 is above the predetermined emission threshold, a compensatory NOx emission reducing activity may be performed in a step S34. The compensatory NOx emission reducing activity is different to the primary NOx emission reducing activity of operating the engine 15 in a two-stroke combustion mode. The temperature of the EATS 20, and the emissions out of the EATS 20, may be estimated or predicted continuously as previously described. In an alternative, a separate step S35 of estimating or predicting the temperature of the EATS 20 is performed as a sub-step of step S34, and/or a separate step S36 of estimating or predicting the emissions out of the EATS 20 is performed as a sub-step of step S34 (typically prior to actual activation of the compensatory NOx emission reducing activity).

Turning briefly back to the engine system 10 of FIG. 2. The engine system 10 typically comprises various valves, such as wastegate, inlet throttle valve, intake and exhaust valves (not shown). For example, the wastegate may be operated in such a way that the flow of exhaust gases to the turbine wheel in a turbocharger of the engine system is varied. Moreover, the engine system 10 may comprise electrical heaters arranged in one or various positions of the EATS 20, e.g. arranged to heat at least one of the emission reducing components. For example, and as seen in FIG. 2, heaters 50, 52, may be arranged in various positions of the engine system 10. In the example embodiment of FIG. 2, two heaters 50, 52, here being a first heater 50 arranged to heat the DOC 30 (or exhaust gases entering the DOC 30) and a second heater 52 arranged to heat the injected reductant and/or the SCR catalyst 32 (by heating exhaust gases upstream of the injection point of the reductant injector 34 and/or upstream of the SCR catalyst 32). However, only one of the two heaters 50, 52 may be provided in the engine system 10, and the heaters may be arranged elsewhere in the engine system 10. The first and second heaters 50, 52 may be electrical heating elements, or combustion units configured for combustion of e.g. HC to produce heat. Each one of heaters 50, 52 may e.g. comprise a lattice or a grating, or a coil or a plate, configured to be heated by electricity led through the lattice, grating, coil, or plate.

Compensatory NOx emission reducing activities may chosen from at least one of the following: using wastegate, late fuel injection, electrical heating of at least a part of the EATS, changing engine valves opening/closing, reduce the flow of exhaust through the engine and EATS. Another example of a compensatory NOx emission reducing activity may be to increase the load, e.g. by charging the battery of the RESS 12, resulting in an increased temperature of the exhausts and an increased temperature of the EATS 20.

In a step S37, during the operation of the engine 15 in the two-stroke combustion, and optionally while performing at least one of the compensatory NOx reducing activities, and in response of that the emissions out of the EATS is below the predetermined emission threshold, the engine operation is changed in a step S37 from the two-stroke combustion mode to the four-stroke combustion mode. Again, the emissions out of the EATS 20 may be estimated or predicted continuously as previously described. In an alternative, a separate step S39 of estimating or predicting the emissions out of the EATS 20 is performed as a sub-step of step S37 (typically prior to actual changing of the engine operation into the four-stroke combustion mode). The step S37 of changing engine operation from the two-stroke combustion mode to the four-stroke combustion mode may be performed regardless of if the temperature of the EATS 20 is below or above the predetermined temperature threshold. However, as an alternative embodiment, the temperature of the EATS 20 is estimated or predicted continuously as previously described, or a separate step S38 of estimating or predicting the temperature of the EATS 20 is performed as a sub-step of step S37 (typically prior to actual changing of the engine operation into the four-stroke combustion mode). Thus, the step S37 of changing engine operation from the two-stroke combustion mode to the four-stroke combustion mode may be performed in further response to that the temperature of the EATS 20 is above the predetermined temperature threshold. As a further alternative, and in response to that the temperature of the EATS 20 is higher than the temperature of the exhaust gases from the engine (i.e. engine out temperature), the engine operation is changed from the two-stroke combustion mode to the four-stroke combustion mode.

For example, the control unit 17 of the vehicle 1 may be configured to perform, or initiate, or at least instruct components of the engine system 10 to achieve said at least one primary NOx reducing activity by operating the diesel engine 15 in a two-stroke combustion mode, and any one of the other steps described with reference to the flow chart of FIG. 3. Thus, the control unit 17 of FIGS. 1 and 2 may be configured to:

It is to be understood that the present invention is not limited to the embodiments described above and illustrated in the drawings; rather, the skilled person will recognize that many changes and modifications may be made within the scope of the appended claims. The present invention is not limited to a certain type of engine system and/or EATS. For example, the EATS 20, or a similar one, may be used for cleaning exhaust gases of other engines than diesel engines. For example, the EATS may be used to clean exhaust gases by converting NOx emissions from the exhaust of internal combustion engines using CNG (Compressed Natural Gas), LPG (Liquified Pressurized Gas), DME (DiMethylEther), and/or H2 (Hydrogen) as fuel. Thus, the engine system may comprise another combustion engine than a diesel engine, e.g. a hydrogen engine.

It should be noted that the naming of the steps of FIG. 3 is not necessarily, but might according to at least one example embodiment, relate to the order in which the steps are carried out. Thus, the order of the steps may be different than that explained here, unless explicitly being dependent on each other. Moreover, one or more steps may be omitted, and/or two of the steps may be carried out simultaneously.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling the operation of an engine system in a vehicle, the engine system comprising an engine configured to operate in at least a two-stroke combustion mode and a four-stroke combustion mode, and an exhaust aftertreatment system (EATS) configured to reduce emissions from the engine exhausts, the method comprising:

determining predicted vehicle operational information comprising at least a predicted upcoming road event and a predicted engine operation associated with the upcoming road event, estimating or predicting a temperature of the EATS;

estimating or predicting emissions out of the EATS, wherein the emissions out of the EATS are calculated emissions associated with the predicted engine operation;

in response to the temperature of the EATS is below a predetermined temperature threshold, and that the emissions out of the EATS is above a predetermined emission threshold, performing a primary NOx emission reducing activity by operating the engine in a two-stroke combustion mode;

subsequently to initiating the operation of the engine in a two-stroke combustion mode, and in response to the emissions out of the EATS is below the predetermined emission threshold, changing engine operation from the two-stroke combustion mode to a four-stroke combustion mode.

2. The method according to claim 1, further comprising:

deactivating at least one engine cylinder of the engine during the operation of the engine in a two-stroke combustion mode.

3. The method according to claim 2, wherein the deactivated engine cylinder is controlled to perform engine compression brake, either as two-stroke or four stroke engine compression brake.

4. The method according to claim 1, further comprising: prior to changing engine operation from the two-stroke combustion mode to the four-stroke combustion mode, and in response to the temperature of the EATS is below the predetermined temperature threshold, and that the emissions out of the EATS is above the predetermined emission threshold, performing a compensatory NOx emission reducing activity different to operating the engine in a two-stroke combustion mode.

5. The method according to claim 4, wherein the compensatory NOx emission reducing activity includes at least one of the following: using a wastegate, late fuel injection, electrical heating of at least a part of the EATS, changing engine valves opening/closing, reducing the flow of exhaust through the engine and EATS.

6. The method according to claim 1, wherein the estimated or predicted emissions out of the EATS comprises an amount of NOx.

7. The method according to claim 1, wherein the emissions out of the EATS is predicted cold-start emissions associated with the predicted engine operation.

8. The method according to claim 1, wherein the predicted vehicle operational information is based on historical or statistical data of the vehicle operation, or is scheduled vehicle operational information based on a pre-determined planned vehicle operation.

9. The method according to claim 1, wherein changing engine operation from the two-stroke combustion mode to a four-stroke combustion mode is performed when the temperature of the EATS is below or above the predetermined temperature threshold.

10. A non-transitory computer readable medium carrying a computer program comprising program code comprising instructions to execute the steps of the method claim 1 when said computer program is run on a computer.

11. A control unit for controlling the operation of an engine system in a vehicle, the control unit being configured to perform the steps of the method according to claim 1.

12. An engine system of a vehicle, the engine system comprising and engine configured to operate in at least a two-stroke combustion mode and a four-stroke combustion mode, and an exhaust aftertreatment system (EATS) configured to reduce emissions from the engine exhausts, the EATS comprising a control unit configured to:
- determine predicted vehicle operational information comprising at least a predicted upcoming road event and a predicted engine operation associated with the upcoming road event,
- estimate or predict a temperature of the EATS;
- estimate or predict emissions out of the EATS, wherein the emissions out of the EATS are calculated emissions associated with the predicted engine operation;
- in response to the temperature of the EATS is below a predetermined temperature threshold, and that the emissions out of the EATS is above a predetermined emission threshold, instruct the engine system to perform a primary NOx emission reducing activity by operating the engine in a two-stroke combustion mode;
- subsequently to initiating the operation of the engine in a two-stroke combustion mode, and in response to the emissions out of the EATS is below the predetermined emission threshold, instructing the engine to change its engine operation from the two-stroke combustion mode to a four-stroke combustion mode.

13. A vehicle comprising an engine system according to claim 12.

14. A method for controlling the operation of an engine system in a vehicle, the engine system comprising an engine configured to operate in at least a two-stroke combustion mode and a four-stroke combustion mode, and an exhaust aftertreatment system, EATS configured to reduce emissions from the engine exhausts, the method comprising:
- estimating or predicting the temperature of the EATS;
- estimating or predicting the emissions out of the EATS;
- in response of that the temperature of the EATS is below a predetermined temperature threshold, and that the emissions out of the EATS is above a predetermined emission threshold, performing a primary NOx emission reducing activity by operating the engine in a two-stroke combustion mode, and deactivating at least one engine cylinder of the engine during the operation of the engine in a two-stroke combustion mode wherein the deactivated engine cylinder is controlled to perform engine compression brake, either as two-stroke or four stroke engine compression brake;
- subsequently to initiating the operation of the engine in a two-stroke combustion mode, and in response of that the emissions out of the EATS is below the predetermined emission threshold, changing engine operation from the two-stroke combustion mode to a four-stroke combustion mode.

15. An engine system of a vehicle, the engine system comprising and engine configured to operate in at least a two-stroke combustion mode and a four-stroke combustion mode, and an exhaust aftertreatment system, EATS configured to reduce emissions from the engine exhausts, the EATS comprising a control unit configured to:
- estimate or predict the temperature of the EATS;
- estimate or predict the emissions out of the EATS;
- in response of that the temperature of the EATS is below a predetermined temperature threshold, and that the emissions out of the EATS is above a predetermined emission threshold, instruct the engine system to perform a primary NOx emission reducing activity by operating the engine in a two-stroke combustion mode, and to deactivate at least one engine cylinder of the engine during the operation of the engine in a two-stroke combustion mode wherein the deactivated engine cylinder is controlled to perform engine compression brake, either as two-stroke or four stroke engine compression brake;
- subsequently to initiating the operation of the engine in a two-stroke combustion mode, and in response of that the emissions out of the EATS is below the predetermined emission threshold, instructing the engine to change its engine operation from the two-stroke combustion mode to a four-stroke combustion mode.

* * * * *